(12) United States Patent
Kantschuk

(10) Patent No.: US 6,744,811 B1
(45) Date of Patent: Jun. 1, 2004

(54) BANDWIDTH MANAGEMENT FOR DSL MODEM POOL

(75) Inventor: Amir Kantschuk, Ramat Gan (IL)

(73) Assignee: Actelis Networks Inc., Alameda, CA (US)

( * ) Notice: Subject to any disclaimer, the term of this patent is extended or adjusted under 35 U.S.C. 154(b) by 688 days.

(21) Appl. No.: 09/591,488

(22) Filed: Jun. 12, 2000

(51) Int. Cl.[7] ................................. H04B 1/38
(52) U.S. Cl. ...................................... 375/222
(58) Field of Search ........................... 375/222, 225, 375/224; 379/93.01, 27

(56) References Cited

U.S. PATENT DOCUMENTS 6,128,348 A * 10/2000 Kao et al. .................. 375/260

OTHER PUBLICATIONS

Binder Capacity Maximization by Exercising Power Control; AT&T Shannon Labs contribution paper to T1.E1 standard committee #T1E1.4/2000–056, Feb. 2000.
Joint Signaling Strategies for Approaching The Capacity of Twisted–Pair Channels; Andrew Sendonaris, IEEE Transactions on Communications Vol 46, No. 5, May 1998.

* cited by examiner

Primary Examiner—Khai Tran
(74) Attorney, Agent, or Firm—Eitan, Pearl, Latzer & Cohen Zedek, LLP

(57) ABSTRACT

A method for managing the bandwidth of a modem pool having at least two co-interfering modems, the method including measuring an SNR margin for at least two of the co-interfering modems, and adjusting the bit rate of each of the co-interfering modems such that the SNR margin of each of the co-interfering modems is between a first and a second predetermined threshold.

4 Claims, 3 Drawing Sheets

BANDWIDTH MANAGEMENT FOR DSL MODEM POOL

FIELD OF THE INVENTION

The present invention relates to telecommunications systems in general, and more particularly to methods and apparatus for bandwidth management for DSL modem pools.

BACKGROUND OF THE INVENTION

The ever-increasing demand for high-speed data communications services and greater bandwidth is largely due to the popularity of the Internet and other data-intensive, high bandwidth applications. Both businesses and consumers are demanding higher bandwidth connections and faster Internet access. Another source for this demand is the increasing use by businesses of data communications networks (including traffic over the Internet) for the transmission of documents and electronic mail.

Digital Subscriber Loop (DSL) technology provides one approach to addressing the demand for high-speed telecommunications service. DSL technology refers to several types of services that use advanced modem elements to transmit digital signals from a data source over copper wires. Many telephone companies have embraced DSL technology as an immediate broadband solution to serve the current demand by getting more out of their existing copper infrastructure. DSL modem elements permit high data rate transmission of data over the public switched telephone network (PSTN) at multiple megabit speeds using sophisticated signal processing techniques that permit voice and data to travel simultaneously over the same analog copper twisted pair wire.

Management of co-interfering modems in a modem pool, such as where two or more modem connections are carried via the same copper wire bundle, is faced with several difficulties.

Current modem pool arrangements call for initializing one or more modems in a modem pool with a large predetermined margin, thereby diminishing throughput. Furthermore, when initializing a single modem in a modem pool, existing systems do not compensate for the co-interference of other modems that share the same bundle.

SUMMARY OF THE INVENTION

One aspect of the present invention is a system for managing overall PSD in a wire bundle by controlling the PSD of each modem element in a modem pool in such a way that the overall throughput is optimized while the overall PSD complies with PSD regulations. The present invention also provides for static and dynamic bandwidth management that maximizes the overall throughput of a transmission that is spread across a modem pool and its SNR while minimizing the overall BER.

Static bandwidth management is employed at system start-up by setting a rate for each modem in a modem pool in a way that maximizes the aggregate bit rate of the entire modem pool. The process preferably provides a consistent result for consecutive processes. Dynamic bandwidth management is employed continually at steady state to preserve the system's SNR margin. Since DSL environments suffer from temporal effects such as external disturbances, temperature shifts, etc., it is desirable to manage bit rates after initial system start-up to minimize SNR and BER fluctuations due to such effects.

One aspect of the present invention is a method for managing the bandwidth of a modem pool having at least two co-interfering modems, the method including measuring an SNR margin for at least two of the co-interfering modems, and adjusting the bit rate of each of the co-interfering modems such that the SNR margin of each of the co-interfering modems is between a first and a second predetermined threshold.

In another aspect of the present invention the measuring step comprises measuring the SNR margin with respect to a maximum allowable BER.

In another aspect of the present invention the method further includes setting any of the modems in the modem pool to a first bit rate prior to the measuring step.

In another aspect of the present invention the measuring step is performed for each of the modems concurrently.

In another aspect of the present invention the adjusting step is performed for each of the modems concurrently.

In another aspect of the present invention the setting step is performed for each of the modems concurrently.

In another aspect of the present invention the at least two co-interfering modems use different modulation schemes, the $SNR_{ref}$ differs for each of said co-interfering modems, and each $SNR_{ref}$ corresponds to one of said modulation schemes.

In another aspect of the present invention the adjusting step includes adjusting the bit rate B of a modem i according to the formula $$B_i^{(n+1)} = B_i^{(n)} + \left(B_i^{(n)} \cdot \frac{M_i^{(n)}}{SNR_{ref}}\right) + w_i^{(n)}$$

where $M_i$ is the SNR margin of the modem i being adjusted, where $SNR_{ref}$ is the SNR that corresponds to the maximum BER, and where $w_i$ is uniformly distributed noise over $[-r/2, r/2]$ where r is a minimum bit rate increment.

In another aspect of the present invention the measuring and adjusting steps are performed a plurality of iterations.

In another aspect of the present invention the measuring and adjusting steps are performed a plurality of iterations until the SNR margin of all of the modems have been optimized such that the overall bit rate no longer improves with each iteration.

In another aspect of the present invention the measuring and adjusting steps are performed a predetermined number of iterations.

Another aspect of the present invention is apparatus for managing the bandwidth of a modem pool having at least two co-interfering modems including means for measuring an SNR margin for at least two of the co-interfering modems, and means for adjusting the bit rate of each of the co-interfering modems such that SNR margin of each of the co-interfering modems is between a first and a second predetermined threshold.

In another aspect of the present invention the means for measuring measures the SNR margin with respect to a maximum allowable BER.

In another aspect of the present invention the apparatus firer includes means for setting any of the modems in the modern pool to a first bit rate prior to the measuring step.

In another aspect of the present invention the means for adjusting is operative to adjust each of the modems concurrently.

In another aspect of the present invention the means for setting is operative to set each of the modems concurrently.

In another aspect of the present invention the means for adjusting is operative to adjust the bit rate B of a modem i according to the formula $$B_i^{(n+1)} = B_i^{(n)} + \left(B_i^{(n)} \cdot \frac{M_i^{(n)}}{SNR_{ref}}\right) + w_i^{(n)}$$

the $M_i$ is the SNR margin of the modem i being adjusted, $SNR_{ref}$ is the SNR that corresponds to the maximum BER, and $w_i$ is uniformly distributed noise over $[-r/2, r/2]$ where r is a minimum bit rate increment.

In another aspect of the present invention the at least two co-interfering modems use different modulation schemes, the $SNR_{ref}$ differs for each of the co-interfering modems, and the each $SNR_{ref}$ corresponds to one of the modulation schemes.

In another aspect of the present invention the means for measuring and adjusting are operative to measure and adjust a plurality of iterations.

In another aspect of the present invention the means for measuring and adjusting are operative to measure and adjust a plurality of iterations until the SNR margin of all of the modems have been optimized such that the overall bit rate no longer improves with each iteration.

In another aspect of the present invention the means for measuring and adjusting are operative to measure and adjust a predetermined number of iterations.

In another aspect of the present invention the first and second thresholds vary for at least two of the co-interfering modems.

In another aspect of the present invention a minimum and a maximum bit rate vary for at least two of the co-interfering modems.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
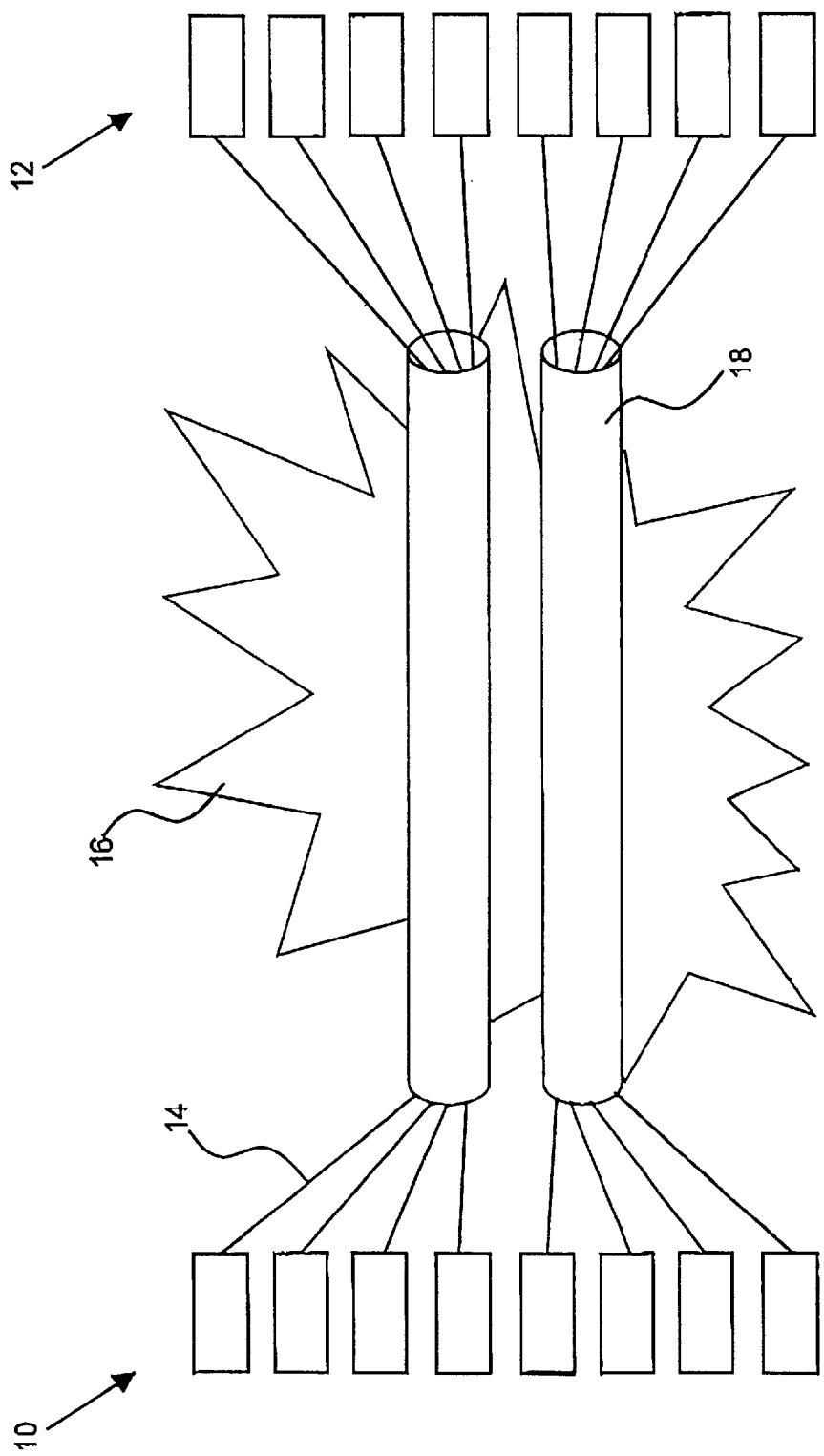
FIG. 1 is a simplified pictorial illustration of a modem pool arrangement useful in understanding the present invention.

Reference is now made to FIG. 1 which is a simplified pictorial illustration of a modem pool arrangement useful in understanding the present invention. A modem pool, generally referenced 10, and comprising a plurality of individual modems is seen in communication with a modem pool, generally referenced 12, via a plurality of connections 14 over a telephone network 16. Connections 14 are typically copper wire pairs arranged in one or more bundles 18. The modem pools preferably operate in a coordinated maker, such as is described in Applicant/assignee's U.S. patent application Ser. No. 09/510,550 file Feb. 22, 2000, and entitled "High Speed Access System Over Copper Cable Plant," that claims priority from United States Provisional Application Serial No. 60/121,228, filed Feb. 23, 1999, and entitled "Access Express-Vezy High Data Rate Communication Channels Over Copper," both hereby incorporated by reference. The interference on each connection 14, the attenuation coefficients of the NEXT between connections 14, attenuation of each connection 14 from end to end, as well as the BER of each connection 14 may be measured using conventional techniques.

Where one or more data channels by which two modem pools communicate are contained within a single copper wire bundle, other wire pairs in the bundle are likely to be used by other "alien" services. In this case, the overall noise within the bundle is likely to be composed of self-caused near-end crosstalk (NEXT) and that of the alien services. Bundle noise may also come from external interferences such as Radio Frequency Interference (RFI) and noise from electric machinery. Where the modem pools require more than one bundle, one or more of the bundles are preferably completely dedicated to modem pool communications, thereby suffering only from self-NEXT. Normally, the transmission power spectral density (PSD) of each wire pair should comply with PSD regulations. The purpose of such regulations is to avoid the damaging effect of non-controlled cross disturbances of various DSL services that may share the same bundle.

In some DSL systems, such as S.HDSL, changing bit rates requires changing the PSD, as a lower bit rate corresponds to a lower transmission bandwidth, and vice versa. This is done in order to maintain constant transmission power in compliance with telecommunications regulations and standards. In a modem pool arrangement it would be possible to maintain a constant PSD for each channel. However, this would cause modem PSDs to overlap and degrade the overall performance where their wire pairs are close to each other, since the NEXT will reside in all frequencies. Thus, in cases where a complete bundle is dedicated to a modem pool or where a modem pool is spread across several bundles, a system for more effectively managing the PSD of each modem element in the modem pool is needed.

The signal-to-noise ratio (SNR) of the various modem pool channels within a bundle must also be managed properly. The modem SNR is a function of the channel capacity divided by the bit rate. A poor SNR figure means a poor bit error rate (BER). When a very high BER is sensed by a modem, it will eventually lose synchronization and stop transmitting data. It will then attempt to reconnect until a more reasonable BER is achieved. However, where a transmission is spread across a modem pool, a system for setting a rate for each modem in the pool in such a way that seeks to maximize the overall throughput of a transmission and its SNR while minimizing the overall BER would be advantageous.

Figure 2:
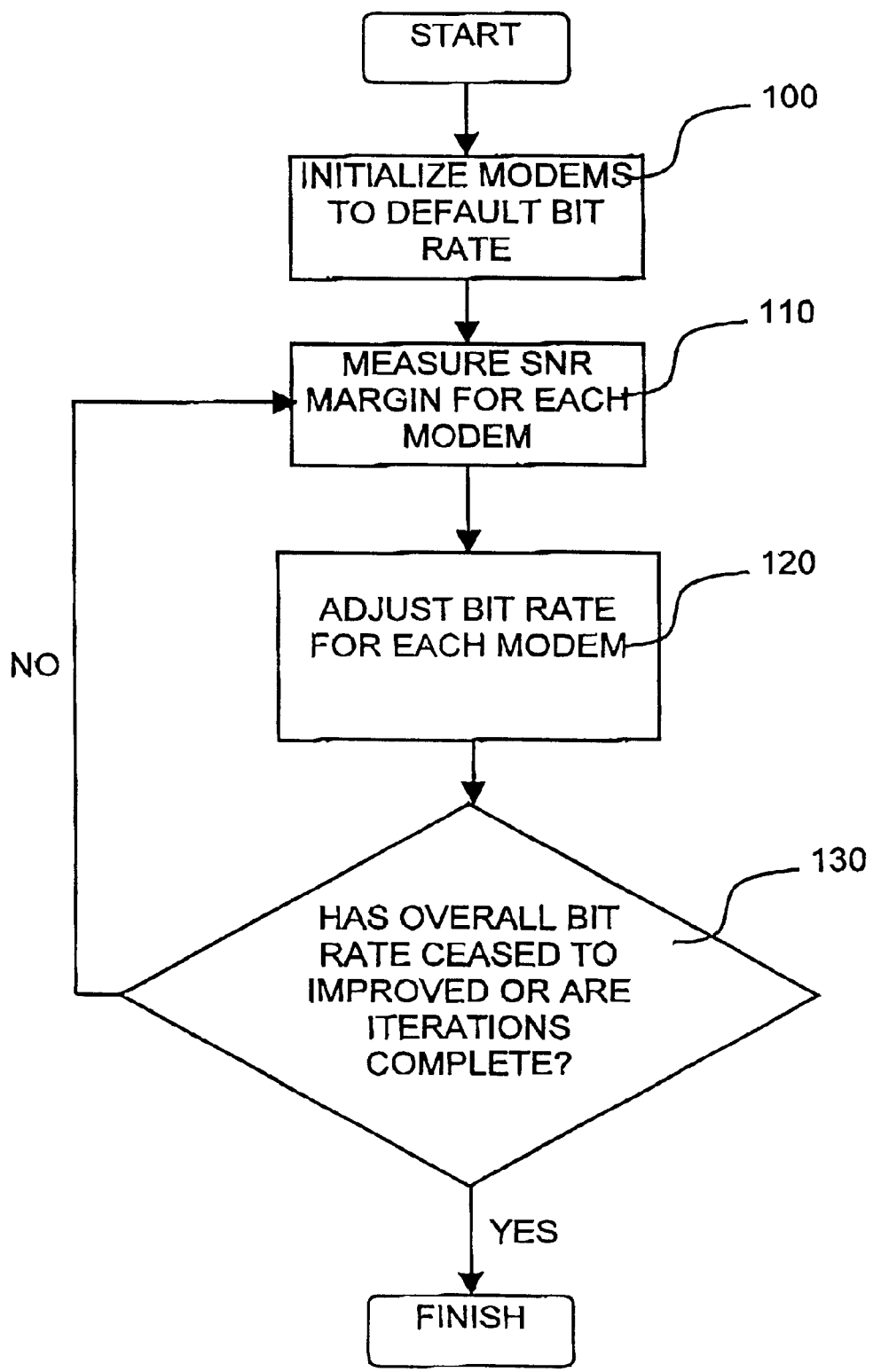
FIG. 2 is a simplified flowchart illustration of a method of static bandwidth management of the system of FIG. 1, operative in accordance with a preferred embodiment of the present invention.

Reference is now made to FIG. 2 which is a simplified flowchart illustration of a method of static bandwidth management of the system of FIG. 1, operative in accordance with a preferred embodiment of the present invention. In the method of FIG. 2 all modems in the modem pool are initialized at a default bit rate, preferably concurrently (step 100). This default rate may be determined based on a previously used bit rate that provided a reasonably consistent BER and SNR. Alternatively, the default bit rate may be determined by measuring the wire attenuation using conventional means and interpolating the bit rate using heuristics such as a look-up table. The default bit rate may also be determined using prior knowledge of transmission wire parameters supplied by the telephone company, or by providing a best guess.

The SNR margin in dB is then measured by each modem as the difference between a modem's SNR and a reference SNR as described hereinbelow (step 110). A modem's SNR may be measured by the modem itself using any conventional means, such as at its equalizer output, its Vitterbi Decoder output or its slicer. The SNR measurement may also be made by an apparatus external to the modem. The SNR margin is calculated as a function of maximum allowable BER in accordance with conventional techniques. For example, in a system utilizing G.shdsl modems, where the maximum BER is $10^{-7}$, a SNR of 22.3 dB is required. Thus, for example, a modem whose bit rate is set at 2.048 Mbps and has an SNR of 24.6 dB has an SNR margin of +2.3 dB. A modem whose SNR margin is at or above a first predetermined threshold, such as 0, and is at or below a second predetermined threshold, which may vary for each modem, is said to have reached its optimal bit rate. The bit rate B of each modem i at a given iteration n ($B_i^{(n)}$) is then adjusted according to the following recursive formula (step 120):

$$B_i^{(n+1)} = B_i^{(n)} + \left(B_i^{(n)} \cdot \frac{M_i^{(n)}}{SNR_{ref}}\right) + w_i^{(n)}$$

where $SNR_{ref}$ is the SNR that corresponds to the maximum BER, $M_i$ is the SNR margin of a modem i and is defined as the modem's $SNR-SNR_{ref}$, and $W_t$ is uniformly distributed noise over $[-r2, r/2]$ where r is the minimum bit rate increment (e.g., 64 Kbps for SDSL systems). This noise is preferably added before quantization to avoid any harm to the convergence of the algorithm that the quantization of separate fixed bit rates might cause.

$SNR_{ref}$ is dependent of the modulation scheme used. If a modem pool includes modems that all use the same modulation scheme, then $SNR_{ref}$ is typically constant for all modems in the modem pool. Where the modem pool includes modems that use different modulation schemes, then a different $SNR_{ref}$ may be used for each modulation scheme.

After a modem's bit rate has been adjusted, and preferably after all modem bit rate adjustments have been concurrently made in a single pass, steps 120 and 130 may be applied until the SNR margin of all modems have been optimized such that the overall bit rate no longer improves with each iteration, or, alternatively, for a predetermined number of iterations, such as 10–15 (step 130).

Figure 3:
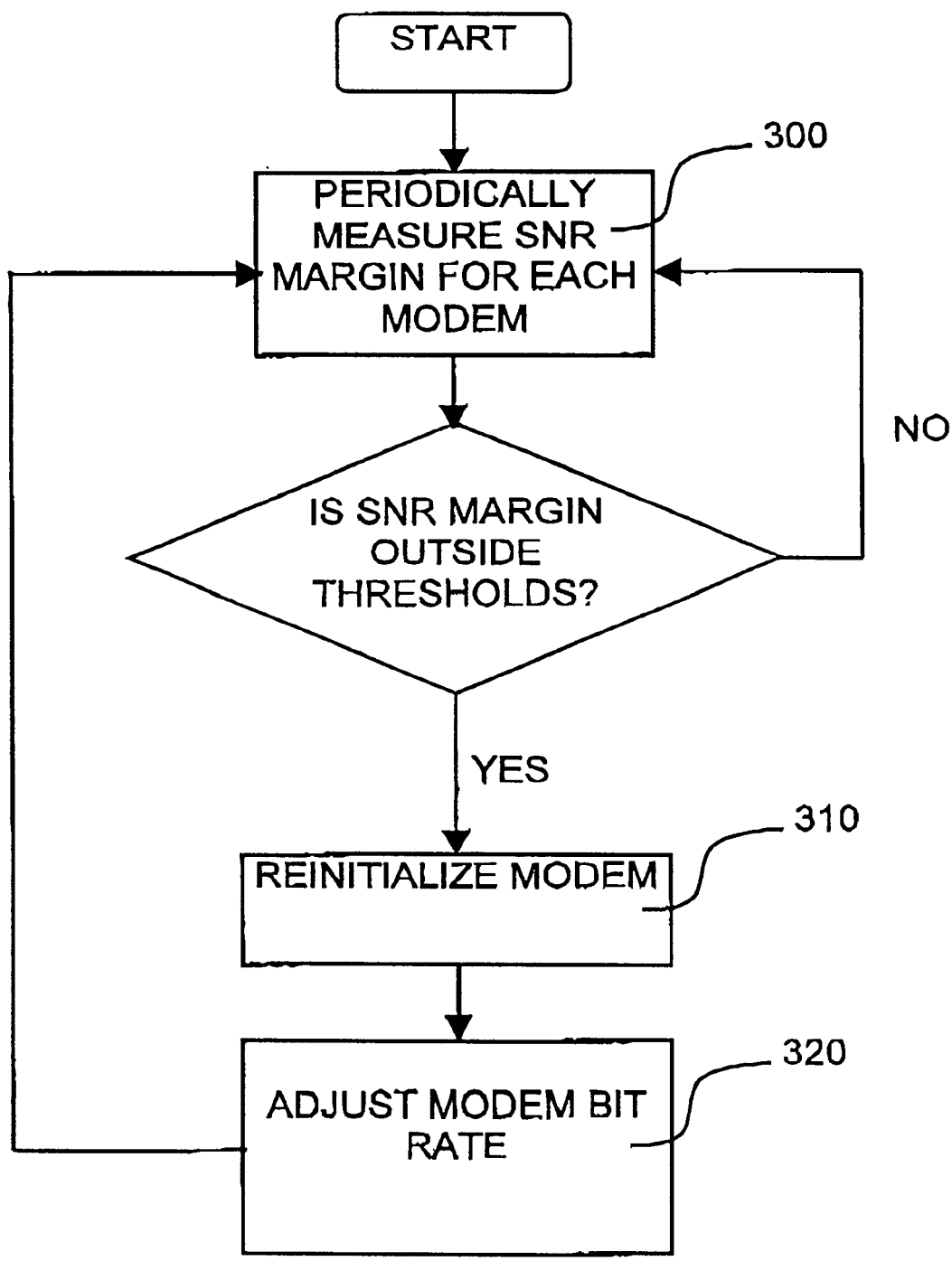
FIG. 3 is a simplified flowchart illustration of a method of dynamic bandwidth management of the system of FIG. 1, operative in accordance with a preferred embodiment of the present invention.

Reference is now made to FIG. 3 which is a simplified flowchart illustration of a method of dynamic bandwidth management of the system of FIG. 1, operative in accordance with a preferred embodiment of the present invention. In the method of FIG. 3 all modems in the modem pool are operating at steady state, preferably having been initialized and optimized in accordance with the method of FIG. 2. The SNR margin in dB is periodically measured for each modem (step 300). A modem whose SNR margin is below a first predetermined threshold or above a second predetermined threshold is reinitialized (step 310). The modem's bit rate is then adjusted according to step 120 of FIG. 2 (step 320). After the modem's bit rate has been adjusted its SNR margin is again measured (step 300). Steps 300 and 310 may be continually applied.

The methods of FIGS. 2 and 3 above are preferably applied to modem pools in which each modem is a single-carrier DSL modem, such as in SDSL, HDSL, S.HDSL, VDSL, and QAM systems.

It is noted that modem bit rates may be limited by government regulations, industry standards, and/or hardware limitations. Such limitations may govern the highest and lowest possible modem bit rates. Thus, bit rate maxima and minima may be imposed such that if a bit rate adjustment as described herein would cause a modem to exceed its maximum bit rate or fall below its minimum bit rate, the bit rate adjustment is not applied, the modem SNR margin notwithstanding. Furthermore, should the measured bit rate of a modem exceed its maximum bit rate or fall below its minimum bit rate, a bit rate adjustment may be applied to bring the modem bit rate within the minimum and maximum bit rates or, alternatively, the modem may be shut off. It is also noted that both the minimum and maximum bit rates and the quantization of the bit rates may vary for each modem. Furthermore, the modems themselves may be of different single-carrier modulation methods or line codes.

The methods of FIGS. 2 and 3 above may be applied simultaneously at two modem pools that are in communication with each other and that cannot accommodate different bit rates in the upstream and downstream directions. After each iteration is completed, both modem pools may negotiate the desired bit rates using conventional modem negotiation techniques. The rate that is decided for the $i^{th}$ modem may be chosen as the lower of the two bit rates computed for it and its counterpart modem. Where different bit rates may be accommodated in the upstream and downstream directions, the method of FIGS. 2 and 3 may be carried out independently at both modem pools.

It is appreciated that one or more of the steps of any of the methods described herein may be omitted or carried out in a different order than that shown, without departing from the true spirit and scope of the invention.

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

The disclosures of all patents, patent applications, and other publications mentioned in this specification and of the patents, patent applications, and other publications cited therein are hereby incorporated by reference.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for managing a bandwidth of a modem pool having at least two co-interfering modems, the method comprising:

measuring an SNR margin for at least two of said co-interfering modems; and adjusting a bit rate of each of said co-interfering modems such that SNR margin of each of said co-interfering modems is between a first and a second predetermined threshold wherein said adjusting step comprises adjusting the bit rate B of a modem i according to the formula $$B_i^{(n+1)} = B_i^{(n)} + \left(B_i^{(n)} \cdot \frac{M_i^{(n)}}{SNR_{ref}}\right) + w_i^{(n)}$$

wherein:

$M_i$ is the SNR margin of the modem i being adjusted, $SNR_{ref}$ is the SNR that corresponds to a maximum BER, and $w_i$ is uniformly distributed noise over $[-r/2, r/2]$ where r is a minimum bit rate increment.

2. A method according to claim 1 wherein said at least two co-interfering modems use different modulation schemes, wherein said $SNR_{ref}$ differs for each of said co-interfering modems, and wherein each $SNR_{ref}$ corresponds to one of said modulation schemes.

3. Apparatus for managing a bandwidth of a modem pool having at least two co-interfering modems comprising:

means for measuring an SNR margin for at least two of said co-interfering modems; and means for adjusting a bit rate of each of said co-interfering modems such that SNR margin of each of said co-interfering modems is between a first and a second predetermined threshold wherein said means for adjusting is operative to adjust the bit rate B of a modem i according to the formula $$B_i^{(n+1)} = B_i^{(n)} + \left( B_i^{(n)} \cdot \frac{M_i^{(n)}}{SNR_{ref}} \right) + w_i^{(n)}$$

wherein:

$M_i$ is the SNR margin of the modem i being adjusted, $SNR_{ref}$ is the SNR that corresponds to a maximum BER, and $w_i$ is uniformly distributed noise over $[-r/2, r/2]$ where r is a minimum bit rate increment.

4. Apparatus according to claim 3 wherein said at least two co-interfering modems use different modulation schemes, wherein said $SNR_{ref}$ differs for each of said co-interfering modems, and wherein each $SNR_{ref}$ corresponds to one of said modulation schemes.

* * * * *